(12) United States Patent
Grinwald et al.

(10) Patent No.: US 8,356,752 B2
(45) Date of Patent: Jan. 22, 2013

(54) ELECTRONIC INKS AND DISPLAYS AND IMAGE DISPLAYING METHODS

(75) Inventors: Yaron Grinwald, Meitar (IL); Stella Stolin Roditi, Rehovot (IL); Yigal Berson, Lod (IL); Zhang-Lin Zhou, Palo Alto, CA (US); Gregg Alan Combs, Monmouth, OR (US); Jeffrey Todd Mabeck, Corvallis, OR (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 79 days.

(21) Appl. No.: 13/142,400

(22) PCT Filed: Dec. 30, 2008

(86) PCT No.: PCT/US2008/088501
§ 371 (c)(1),
(2), (4) Date: Jun. 27, 2011

(87) PCT Pub. No.: WO2010/077238
PCT Pub. Date: Jul. 8, 2010

(65) Prior Publication Data
US 2011/0266347 A1 Nov. 3, 2011

(51) Int. Cl.
*G06K 7/08* (2006.01)
(52) U.S. Cl. .................. 235/451; 235/435; 235/492
(58) Field of Classification Search ............ 235/435, 235/451, 492
See application file for complete search history.

(56) References Cited

U.S. PATENT DOCUMENTS

| | | | |
|---|---|---|---|
| 4,880,432 A | 11/1989 | Egan et al. | |
| 5,360,689 A | 11/1994 | Hou et al. | |
| 6,067,185 A | 5/2000 | Albert et al. | |
| 6,113,810 A | 9/2000 | Hou et al. | |
| 6,117,368 A | 9/2000 | Hou | |
| 6,623,902 B1 | 9/2003 | Ben-Avraham et al. | |
| 6,672,921 B1 * | 1/2004 | Liang et al. | 445/24 |
| 6,727,881 B1 | 4/2004 | Albert et al. | |
| 6,788,449 B2 | 9/2004 | Liang et al. | |
| 6,839,158 B2 | 1/2005 | Albert et al. | |
| 6,949,138 B2 | 9/2005 | Nakamura et al. | |
| 7,071,913 B2 | 7/2006 | Albert et al. | |
| 7,242,513 B2 | 7/2007 | Albert et al. | |
| 7,280,266 B1 | 10/2007 | Chopra et al. | |
| 7,349,147 B2 | 3/2008 | Chopra et al. | |
| 7,391,555 B2 | 6/2008 | Albert et al. | |
| 7,403,325 B2 | 7/2008 | Chopra et al. | |
| 2005/0024710 A1 | 2/2005 | Kanbe | |
| 2006/0079603 A1 * | 4/2006 | Sato et al. | 523/160 |
| 2006/0194138 A1 | 8/2006 | Regev et al. | |

OTHER PUBLICATIONS

Lenssen, Kars-Michiel H., et al. "46.1: Invited Paper: Novel Design for Full-Color Electronic Paper" SID 2008 Digest, pp. 685-688.
Kishi, E. et al. "5.1: Development of In-Plane EPD" SID 2000 Digest, pp. 24-27.
"Ircosperse® 2155 Succinimide dispersant" Product Information Sheet, Jul. 2007, The Lubrizol Corporation, 2 pages.
"A-C® Polyethylenes & Copolymers" Production Information Sheet for A-C5120, © 2001, Honeywell, 1 page.
"A-C® Ethylene Acrylic Acid Copolymer 5120" Product Information Sheet, Jan. 2002, Honeywell, 1 page.
"A-C® Polyethylenes & Copolymers" Product Information Sheet, © 2000, Honeywell, 2 pages.
"AClyn® Low Molecular Weight Ionomers 295" Product Information, © 2002, Honeywell, 1 page.
"A-C® Polyethylenes & Copolymers" Production Information Sheet for A-C575P, © 2002, Honeywell, 1 page.
"A-C® Polyethylenes & Copolymers" Production Information Sheet for Aclyn 295 (Zn), © 2001, Honeywell, 1 page.
"A-C® Ethylene-Maleic Anhydride Copolymer 575P" Production Information Sheet © 2002, Honeywell, 1 page.
International Search Report (ISR) and Written Opinion of the International Searching Authority (ISA) mailed Sep. 16, 2009 from ISA/KR for counterpart PCT Application No. PCT/US2008//088502 (11 pages).

* cited by examiner

*Primary Examiner* — Kristy A Haupt

(57) ABSTRACT

An electronic ink containing charged particles includes a combination of resin particles, a pigment, and a charge director. The resin particles exhibit an average particle size less than 1.0 micron and contain a resin that exhibits a molecular weight of 500 to 20,000. The pigment is loaded on the resin particles. The charge director can physically associate with the resin particles. The charged particles may be negative or positive.

20 Claims, No Drawings

ELECTRONIC INKS AND DISPLAYS AND IMAGE DISPLAYING METHODS

BACKGROUND

Among the wide variety of known electronic displays, some involve electronically controlling the location of charged particles suspended in a fluid. Electrophoretic displays represent one type of electronic display and involve moving the charged particles suspended in the fluid with a Coulombic force exerted on the particles by an applied electrical signal. Some electronic displays are referred to as electronic paper or e-paper, since they can be thin and flexible with paper-like image quality. Electronic displays may use transmitted light, but some use only reflected light.

While a variety of technological approaches have been attempted, opportunities for improvement abound. For example, a challenge exists in producing a bright, full-color image in an electronic display using only reflected light. Unique conditions exist under which light is reflected and charged particles are moved about in a pixel of the display. As a result, technology borrowed from known electrophoretic fluids, such as liquid electrophoretic toner (LEP toner) used in offset printing, has not performed adequately in the electronic display application.

Known electrophoretic fluids may rely on providing a pigment capable of adsorbing a charge or may rely on a combination of a pigment encapsulated by a polymer to provide the charged particles. However, encapsulation is often done in situ during polymerization, where the pigment chemistry and polymer chemistry are interdependent, such that some polymers are only compatible with certain pigments. Also, pigment chemistry may be influential of particle charge, yielding particle charges that may vary between colors. Such incompatibilities and other problems give rise to a search for improved suspensions of charged colorant particles for which particle location can be electronically controlled. These suspensions may be referred to as electronic inks. Some electronic inks may be referred to as electrophoretic inks where the charged particles may be moved with a Coulombic force exerted on the particles by an applied electrical signal.

DETAILED DESCRIPTION OF THE EMBODIMENTS

In an embodiment, an electronic ink containing charged particles includes a combination of resin particles, a pigment, and a charge director. The resin particles exhibit an average particle size less than 1.0 micron and contain a resin that exhibits a molecular weight of 500 to 20,000.

Understandably, the pigment, charge director, and/or other components added to the resin particle may provide a larger ink particle, but the embodiments herein provide an ink with an average ink particle size also less than 1.0 micron. Although minima and/or maxima are listed for the above described ranges and other ranges designated herein, more narrow included ranges may also be desirable and may be distinguishable from prior art. Also, the Examples herein may provide a basis for such more narrow included ranges. Throughout the present document, indication of a molecular weight refers to weight average molecular weight. Unless otherwise described, listing a range of molecular weights for a resin indicates that individual polymer molecules of the resin exhibit molecular weights that are distributed within the range.

The resin may exhibit a molecular weight of 1,000 to 5,000. The resin may be a thermoplastic resin exhibiting a melting point of greater than 50° C., including greater than 90° C. Notably, a low melting point of the resin may limit operating temperature of a device using the electronic ink to avoid degrading the ink. Even so, high melting point resins may exhibit too high of a molecular weight. As one example, the resin may be a wax resin. The pigment is loaded on the resin particles. The charge director can physically associate with the resin particles.

Providing ink particles less than 1.0 micron in size may facilitate imaging in displays with pixels having a dimension of 100 microns or less, and may reduce optical scattering for displays based on subtractive color, which use absorption dominated behavior. The pixel dimension may be the length or width with respect to the viewing plane. The small particle sizes described herein may become increasingly significant with smaller pixel dimensions, for example, 5 to 50 microns, and even 10 to 25 microns.

By way of example, the charge director may form a micelle structure physically associated, but not chemically associated, by hydrophobic bonding with the resin particles to provide at least part of the particle charge. Hydrophobic bonding or, more appropriately, hydrophobic interaction represents a well-known phenomenon that occurs in micellular structures. Essentially, in nonpolar solvents, hydrophilic heads of amphiphilic molecules orient the molecules so as to assemble the hydrophilic heads together inside the micelle with hydrophobic tails assembled outside at the micelle surface. Hydrophobic bonding is also well-known not to infer chemical bonding, but rather a repulsive physical interaction between hydrophobic portions of molecules and a nonpolarized material, such as the resin surface.

Depending partly on the resin selected, the charged particles of the electronic ink may be negative or positive. Speaking generally, an electronic ink containing negatively charged particles may use an acidic resin while an electronic ink containing positively charged particles may use a basic resin. For the negative ink, the resin may include a copolymer of polyethylene grafted with maleic anhydride or a polyethylene-based ionomer. The negative ink resin particles may consist of the copolymer or the ionomer. The ionomer may be poly(ethylene-co-acrylic acid) zinc salt. The acidic resin may exhibit a molecular weight of 1,000 to 5,000, including 1,000 to 3,000. For the positive ink, the resin may include vinyl pyrrolidone/triacontene copolymers. Additional possible basic resins include polyamines, polyamides, and potentially others. The positive ink resin particles may consist of vinyl pyrrolidone/triacontene copolymer. The basic resin may exhibit a molecular weight of 1,000 to 5,000, including 3,000 to 4,500.

Correspondingly, the charge director may be basic for the negative ink and may be acidic for the positive ink. One example of a charge director for negative ink includes sulfosuccinic acid, ditridecyl ester metal salt. The metal salt may be a barium salt. The charge director may consist of the metal salt. One example of a charge director for positive ink includes polyisobutylene succinimide polyamines. The charge director may consist of the polyisobutylene succinimide polyamines. Other known charge directors may be used, for example, those described in WIPO Publication No. WO/2007/130069 (Application No. PCT/US2006/018297) entitled "Charge Director for Liquid Toner" may be suitable.

For either positive or negative ink, the resin particles may exhibit a maximum particle size less than 2.0 microns, perhaps even less than 1.0 micron. Another common characteristic among the resins involves the property of being compatible with a cyan pigment, a magenta pigment, a yellow pigment, a black pigment, and combinations thereof. Such compatibility allows development of CMYK color systems derivable from the same resin/charge director composition. Potentially, a pixel of an electronic display could contain one set of particles with one of the CMYK pigments loaded thereon as well as another set of particles with a different one of the CMYK pigments loaded thereon. Since both sets of particles may be derived from the same resin/charge director composition, their charges and performance may be equivalent and arise independent of pigment chemistry. Incompatibilities are thus less likely to exist.

Also, such compatibility allows tuning or adjustment of the color gamut since the resin exhibits compatibility with combinations of pigments. Individual particles may include more than one of the CMYK pigments and/or other base or secondary pigments and may exhibit any color from various pigment combinations, such as, any color within the available Pantone spot color space. For example, a monochrome display with only one color of particle is not limited to the color of a single pigment but may be any color capable of being derived from a mixture of one or more different pigments.

As described in Examples 2-4, pigment loading may also be varied to provide for adjustment in color depth and even to achieve high color depth in a pixel of an electronic display by optimizing optical density. Pigment loading may be 1-99 weight percent (wt %) of the solids, including 5-95 wt %, or even 5-85 wt %. By providing a resin/charge director composition that functions independent of pigment chemistry, significant flexibility exists in the applications for electronic displays using the described electronic inks.

The combination of resin particles and pigment, wherein the particles contain a resin, may be contrasted with particles produced from in situ encapsulation during polymerization or from other similar known techniques. In the combination, the starting materials include a solid (resin particles) and pigment, and processing yields particles of the solid resin loaded with pigment. Known in situ particles result from polymerization of precursor chemicals in solution in conjunction with encapsulation of pigment also in solution. No combination of resin particles and pigment occurs during known in situ encapsulation since no resin particles exist in the precursor solution. Instead, the only combining that occurs involves polymerization precursors and pigment.

The known combination of polymerization precursors and pigment cannot be considered to constitute or produce a combination of resin particles and pigment. It merely produces polymer-encapsulated pigment, as compared to resin particles loaded with pigment. As appreciated from the discussion herein, identifiable differences exist between resin particles loaded with pigment and known polymer-encapsulated pigment, not the least of which include enabling the use of various combinations of pigments with a given resin/charge director composition.

The electronic ink containing negatively charged particles may include a combination of resin particles, a pigment, a charge director and a charge adjuvant. The charge adjuvant may chemically bond to the resin particles. Examples of a charge adjuvant include metallic soaps containing a metal, such as Al, Zn, Ca, Mg, other metals, and combinations thereof, and a ligand, such as stearate, oleate, other ligands, and combinations thereof. Two examples include aluminum tristearate and aluminum distearate. Other known charge adjuvants may be used, for example, those described in WIPO Publication No. WO/2008/085709 (Application No. PCT/US2007/088627) entitled "Charge Adjuvants in Electrostatic Inks" may be suitable. Charge adjuvants might be used that physically associate, but do not chemically bond, with the resin, for example, white pigment ($TiO_2$) solids impregnated in negative resin or TPP (triphenyl phosphine) solids impregnated in a positive resin.

Essentially, the charge adjuvant provides a molecular structure to trap charge director molecules around a resin particle. Hence, as shown in Example 5 below, particle conductivity may increase. Without being limited to any particular theory, it is believed that an equilibrium exists between free charge and the charge director physically associated with particles and the equilibrium is exhibited in the particle conductivity. When aluminum tristearate was used, it is hypothesized that the equilibrium shifted to a lower volume of free charge, increased charge director association with the particles, and enhanced particle conductivity. Particle conductivity may be greater than 50 picosiemens (pS), for example, greater than 200 pS.

For the copolymer of polyethylene grafted with maleic anhydride, since hydrolysis of the maleic anhydride provides two acid sites, it is believed that both acid sites bind to the aluminum atom of aluminum distearate, releasing both stearic acid molecules and leaving no molecular structure to trap charge director molecules. However, use of aluminum tristearate allows both acid sites to react with the aluminum atom, still releasing two stearic acid molecules, but keeping one stearic acid molecule bound to the aluminum to provide a molecular structure for trapping charge director molecules.

The charge adjuvant may also provide a dispersing agent. For example, the charge adjuvant may include a metallic soap and the resin may provide an acidic surface that reacts with the charge adjuvant and releases the dispersing agent from the charge adjuvant. From the discussion above regarding trapping the charge director, it is noted that aluminum distearate and aluminum tristearate are metallic soaps. Also, the copolymer of polyethylene grafted with maleic anhydride and poly (ethylene-co-acrylic acid) zinc salt may provide a resin with an acidic surface. Further, stearic acid may function as a dispersing agent in an electronic ink. Consequently, the release of stearic acid from the charge adjuvant reaction with the resin constitutes release of a dispersing agent. It will be appreciated that other metallic soaps or fatty acid salts may be used in combination with other acidic resins to achieve a similar result. As may be understood from the discussion above regarding charge adjuvants and charge directors, selection of components may influence dispersion stability and chargeability of particles.

In addition to a charge adjuvant providing a dispersing agent, the charge adjuvant may function as a viscosity control agent in a method for making electronic ink. In one embodiment, a method for making electronic ink includes providing a resin exhibiting a molecular weight of 500 to 20,000 and a pigment. While processing the resin and pigment together, the method includes forming resin particles containing the resin and loading the pigment on and dispersing the pigment among the resin particles. The pigment-loaded resin particles exhibit an average particle size less than 1.0 micron. The method includes charging the pigment loaded resin particles by physically associating a charge director.

Examples 1-11 below describe formation and property evaluation of various electrophoretic inks using such a method. In the Examples, a grinding mill or ball mill is used to reduce the size of resin particles and to disperse and load pigment on the resin particles, but other particle size reduction apparatuses may be used. In general, grinding resin particles and dispersing pigment is widely practiced in producing toner particles for printing. Methods such as those described in U.S. Pat. No. 6,623,902 entitled "Liquid Toner and Method of Printing Using Same" and other known methods may be adapted to the embodiments herein. However, resins having a molecular weight of 500 to 20,000, and especially wax resins having a molecular weight of 1,000 to 5,000, are not used in producing toner particles. Instead, printing on paper involves use of resins with increased toughness and durability to afford the flaking, peeling, rub resistance, etc. fixing parameters important when printing on paper.

Resins discussed in the present document are instead used to move pigment within an electronic pixel. Despite the differences, the present document provides adequate details enabling those of ordinary skill to adapt known toner resin grinding and pigment dispersion techniques to producing electronic ink.

A viscosity control agent assists in maintaining viscosity of starting materials combined in a resin grinding and pigment dispersion process to adequately reduce particle size. During the processing, depending on physical properties of the resin and pigment and the operating conditions for grinding, pigment may become encapsulated by resin when loading it on the resin, though encapsulation is not required. A viscosity control agent may be selected that, after grinding, functions as a charge adjuvant. As discussed above, the charge adjuvant may also release a dispersing agent. Understandably, adjusting the level of viscosity control agent may affect the ultimate particle conductivity.

Using a low molecular weight resin has been discovered to yield average particle sizes less than 1.0 micron. Such small particle sizes were not previously obtained even in similar methods used to make toner particles. For example, NUCREL 699 (a copolymer of ethylene and methacrylic acid available from El du Pont de Nemours in Wilmington, Del.) commonly used in toner was not grindable to sub-micron particles. It is hypothesized that, since toner particles involve higher molecular weight resins to afford proper fixing parameters, the resins do not give way to small particle sizes.

As indicated, producing negatively charged particles in electronic ink may include providing acidic resin. However, observation indicates that acid groups in resin may invoke hydrogen bond cross-linking, making particle size reduction less effective. In the presence of acid group cross-linking via hydrogen bonds, difficulty may be encountered in producing resin particles exhibiting an average particle size less than 1.0 micron. However, identification of suitable techniques for overcoming hydrogen bonding in addition to those described herein is conceivable.

Notably, poly(ethylene-co-acrylic acid) zinc salt and copolymers of polyethylene grafted with maleic anhydride include "blocked" acid groups. In the copolymer including maleic anhydride, maleic acid groups are blocked by the existence of the anhydride. Maleic acid groups may be unblocked by hydrolysis, providing an acidic surface. Hydrolysis may be accomplished with the addition of water, for example, during an appropriate phase in particle size reduction, such as before adding charge adjuvant. In the copolymer including acrylic acid salt, acrylic acid groups are blocked by reaction with a metal base, specifically a zinc base, to produce a metal salt. Acrylic acid groups may be unblocked by dissociation of the metal ion. Dissociation may be accomplished with the addition of solvent, for example, during an appropriate phase in particle size reduction or thereafter, when adding carrier fluid. Other blocking/unblocking schemes are conceivable relying on the same types of chemical bonds or other types of chemical bonds, such as partial esterification of acid groups. Also, it is conceivable that at least some of the acid groups of a resin may be blocked, with the possibility that other acid groups are not blocked. Even so, all of the acid groups of a resin might be blocked.

The presence of ionic acid groups bound to a metal ion in the salt increases polarity of the resin and enhances charging. In addition, a viscosity control agent and/or a charge adjuvant may react with acid groups to provide the benefits described herein. By using resins with blocked acid groups, particle size reduction may proceed with less hindrance while still providing acid groups for producing negatively charged particles.

While a charge adjuvant may also provide a dispersing agent, as discussed above, a dispersing agent may be provided in addition to or instead of a dispersing agent provided by a charge adjuvant. In the context of LEP toner, a dispersing agent is of little significance. However, for electronic ink, high particle mobility may enhance imaging in an electronic display. Often, electronic displays involve either compacting or dispersing charged particles across the pixel using an electrical signal. Since many signal application cycles may be applied to repeatedly compact and disperse charged particles, an effective dispersing agent, whether added or provided by the charge adjuvant, may be helpful.

Observation has indicated that particle size also contributes to particle mobility. That is, achieving a small particle size and providing a dispersing agent both contributed to high mobility particle transport. For less than 1.0 micron particles in a pixel with electrodes separated 10 to 30 microns, a particle conductivity of greater than 200 pS may provide a visible change in particle compaction/dispersion in less than 1 second.

In one embodiment, an electronic display includes a pixel, an electrode in the pixel, and electronic ink in the pixel. As described elsewhere herein, the ink contains charged particles that include a combination of resin particles, a pigment, and a charge director. Average particle size may be less than 1.0 micron. A dispersing agent may be provided, enhancing particle mobility. Various types and configurations of electrodes known to those of ordinary skill may be used, including bare electrodes contacting the ink and/or electrodes coated so as not to contact the ink.

Negatively charged particles may contain a resin copolymer of polyethylene grafted with maleic anhydride or a resin polyethylene-based ionomer. The combination may further include a charge adjuvant that chemically bonds to the resin particles. Positively charged particles may contain a resin vinyl pyrrolidone/triacontene copolymer.

In another embodiment, an image displaying method includes providing an electronic display including a pixel allowing visible light to enter and exit the pixel, an electrode in the pixel, and electronic ink in the pixel. As described elsewhere herein, the ink contains charged particles that include a combination of resin particles, a pigment, a charge director, and a dispersing agent. The method includes applying an electrical signal to the pixel using the electrode and compacting the charged particles using the electrical signal. The electrical signal is changed and the charged particles are dispersed across the pixel. The pigment is loaded on the resin particles, the resin exhibiting the property of being compatible with a cyan pigment, a magenta pigment, a yellow pigment, a black pigment, other pigments, and combinations thereof. The charge director physically associates with the resin particles.

By way of example, the method may include repeatedly compacting and dispersing during at least 10 signal application cycles without substantial degradation of the charged particles. Practically, the cycling may occur millions of times in an electronic display. However, even a few cycles readily distinguish attempted use of liquid electrophoretic (LEP) toner as an electronic ink. LEP toner was observed to cycle only once or twice as a result of particle degradation. It is conceivable that the method may operate for resin particles as large as 2.0 microns, however, based partly on the expected small dimensions of electronic pixels and the desire to reduce optical scattering, performance advantages exist for resin particles less than 1.0 micron.

Negatively charged particles may include a resin copolymer of polyethylene grafted with maleic anhydride or a resin polyethylene-based ionomer, both resins exhibiting a molecular weight of 1,000 to 3,000. Positively charged particles may include a resin vinyl pyrrolidone/triacontene copolymer exhibiting a molecular weight of 3,000 to 4,500.

The Examples below describe various additional embodiments.

EXAMPLE 1

A-C 575 wax resin (copolymer of polyethylene grafted with maleic anhydride provided as a powder available from Honeywell in Morristown, New Jersey) was used exhibiting a molecular weight of 1,000 to 3,000, a melting point of 106° C. by Mettler drop technique (ASTM D-3954), and a saponification number of 34 mg KOH/g. The A-C 575 was put in a S-0 ATTRITOR batch grinding mill available from Union Process Co. (Akron, Ohio) along with blue 15:3 cyan pigment (available from Toyo Ink Mfg. Co., Ltd in Tokyo, Japan), aluminum distearate viscosity control agent (VCA), and ISO-PAR L liquid carrier (isoparaffinic solvent available from Exxon Mobile Corp. in Fairfax, Va.). The formulation in the mill contained 78 parts wax resin, 14 parts pigment, and 8 parts VCA on a solids weight basis in enough ISOPAR L to provide 18 weight percent (wt %) nonvolatile solids (NVS) during grinding. Pigment loading was 14 wt %.

After grinding for at least 6 hours at 35° C., the resulting dispersion exhibited a particle size distribution with an average of 0.385 micrometers (microns) and a maximum of 0.632 microns as determined using a MASTERSIZER 2000 particle analyzer available from Malvern Instruments Ltd. in Worcestershire, UK. A scanning electron microscope (SEM) photo showed a block structure for the particles and an average particle size of 0.8 microns. Viscosity at 8.4% NVS was 411 centipoise (cP).

The dispersion was negatively charged with 50 mg of sulfosuccinic acid, ditridecyl ester barium salt charge director per gram of NVS. The charged dispersion was diluted to 2 wt % NVS with ISOPAR L and, in a 1 millimeter deep charge-to-mass ratio (Q/m) test cell, exhibited low field conductivity of 88 picosiemens/centimeter (pS/cm) and high field conductivity of 325 pS/cm. Using a film of electroplated particles from the charged dispersion, optical density was 1.56 at a defined mass per area (DMA) of 0.084 milligram/centimeter$^2$ (mg/cm$^2$). The 2% NVS charged dispersion was put in an electronic chamber having dimensions of 100×100×10 microns deep with two interdigitated electrodes 30 microns apart. The colored, charged ink particles were observed moving between the electrodes under an alternated voltage.

EXAMPLE 2

The method of Example 1 was followed except the formulation in the mill contained 47 parts wax resin, 45 parts pigment, and 8 parts VCA on a solids weight basis. Also, aluminum tristearate was used instead of aluminum distearate VCA. Pigment loading was 45 wt %.

The dispersion was negatively charged and diluted as in Example 1. The 2% NVS charged dispersion was put in an electronic chamber as in Example 1 and the colored, charged ink particles were observed moving between the electrodes under an alternated voltage. Even though the particles had 45% pigment loading instead of the 14% pigment loading of Example 1, it was observed that the extent of dispersion of the charged particles still affected color depth.

EXAMPLE 3

The method of Example 2 was followed in forming a dispersion except the formulation in the mill contained 29 parts wax resin, 63 parts pigment, and 8 parts VCA on a solids weight basis. Pigment loading was 63 wt %. The dispersion was negatively charged and diluted as in Example 1.

EXAMPLE 4

The 2% NVS charged dispersions of Examples 1, 2, and 3 were each diluted by 100 to a 0.02% dispersion to correlate optical density results from the 1 mm deep Q/m test cell to a 10 micron (0.01 mm) deep electrophoretic cell of a display device. The diluted 0.02% NVS charged dispersions of the Examples 1, 2, and 3 dispersions respectively exhibited optical densities of 0.42, 0.9, and 1 at a DMA of 0.013 mg/cm$^2$. Data analysis yielded a linear relationship between pigment loading and optical density allow extrapolation to an optical density of about 1.2 for 100% pigment loading.

EXAMPLE 5

The method of Example 2 was followed in forming a dispersion except aluminum distearate was used instead of aluminum tristearate VCA. The dispersion was negatively charged and diluted as in Example 1. The 2% NVS charged dispersion was put in an electronic chamber as in Example 1 and the colored, charged ink particles were observed moving between the electrodes under an alternated voltage.

A study of the effect of low field (LF) conductivity on particle conductivity was undertaken in the Q/m test cell comparing performance of the Example 2 aluminum tristearate VCA to the Example 5 aluminum distearate VCA. A sharp increase in particle conductivity at 45 pS LF was observed for the dispersion using aluminum distearate, reaching 200 pS at low field conductivity levels above about 80 pS. But a similarly sharp increase was observed at a lower level of 25 pS LF for the dispersion using aluminum tristearate, reaching 200 pS at low field conductivity levels above about 65 pS. Consequently, particle conductivity was higher at all LF levels above 25 pS for the aluminum tristearate.

EXAMPLE 6

The Example 1 A-C 575 wax resin was put in a S-0 ATTRITOR batch grinding mill along with 0.2 g of water, which constituted 2 equivalents based on the saponification number to fully hydrolyze the maleic anhydride to di-acid, and was ground for 2 hours in enough ISOPAR L to provide 18 wt % NVS during grinding. Thereafter, 2 mg of sulfosuccinic acid, ditridecyl ester barium salt charge director per gram of wax resin was added to encapsulate excess water, if any, in micelles to prevent subsequent hydrolysis of VCA and was ground for 2 hours. Blue 15:3 (TOYO) cyan pigment and aluminum tristearate VCA were added with enough ISOPAR L to provide 18 wt % NVS and ground for 6 hours. The final formulation in the mill contained 47 parts wax resin, 45 parts pigment, and 8 parts VCA on a solids weight basis. Pigment loading was 45 wt %. All grinding was at 35° C. and yielded a particle size of 0.8 microns in the dispersion.

EXAMPLE 7

Several samples of the dispersion of Example 6 and the dispersion of Example 2 were negatively charged with amounts of sulfosuccinic acid, ditridecyl ester barium salt charge director varying from 5 to 50 mg per gram of NVS. The charged dispersions were diluted to 2 wt % NVS with ISOPAR L and evaluated in the Q/m test cell. Over the range of charge director amount, particle conductivity was higher for the Example 6 charged dispersion including resin pretreated with water. For 20 to 50 mg/g of charge director, particle conductivity was noticeably higher by about 70 to 90 pS. For the Example 2 charged dispersion, particle conductivity exceeded 200 pS for charge director amounts above about 40 mg/g. For the Example 6 charged dispersion, particle conductivity exceeded 200 pS for charge director amounts above about 30 mg/g. It is hypothesized that the water pretreatment allowed increased charge director association with the particles.

EXAMPLE 8

ACLYN 295 wax resin (ethylene-acrylic acid zinc ionomer provided as granules available from Honeywell in Morristown, N.J.) was used exhibiting a molecular weight of 1,000 to 3,000, a melting point of 99° C. by differential scanning calorimetry, and an acid number of nil (since it is an acid salt). The ACLYN 295 was put in a S-0 ATTRITOR batch grinding mill along with blue 15:3 (TOYO) cyan pigment, aluminum distearate VCA, and ISOPAR L liquid carrier. The formulation in the mill contained 47 parts wax resin, 45 parts pigment, and 8 parts VCA on a solids weight basis in enough ISOPAR L to provide 18 wt % NVS during grinding. Pigment loading was 45 wt %. After grinding for at least 6 hours at 35° C., the resulting dispersion exhibited an average particle size of 0.8 microns as determined using a MASTERSIZER 2000 particle analyzer. An SEM photo of the particles showed an average particle size of 1.2 microns. Pigment particles with a size of about 70 to 100 nanometers (nm) were dispersed and loaded on the wax resin particles.

The dispersion was negatively charged with sulfosuccinic acid, ditridecyl ester barium salt charge director. The charged dispersion was diluted to 2 wt % NVS with ISOPAR L and exhibited particle conductivities in the Q/m test cell, depending on level of low field conductivity, of about 2 to 8 times that of the Example 2 charged dispersion using equivalent amounts of charge director. The Example 8 charged dispersion exceeded 200 pS at levels of low field conductivity above about 25 pS and reached over 450 pS at low field conductivity of about 50 pS. The Example 2 charged dispersion exceeded 200 pS at levels of low field conductivity above about 65 pS and approached 450 pS at low field conductivity of about 110 pS. The 2% NVS charged dispersion was put in an electronic chamber having dimensions of 100×100×10 microns deep with two interdigitated electrodes 30 microns apart. The colored, charged ink particles were observed moving between the electrodes under an alternated voltage.

EXAMPLE 9

Additional dispersions were prepared following the method of Example 8 but using less VCA in comparison to the 8 wt % VCA dispersion in Example 8. A 4 wt % VCA dispersion included 51 parts wax resin, 45 parts pigment, and 4 parts VCA on a solids weight basis. A 0 wt % VCA dispersion included 55 parts wax resin, 45 parts pigment, and 0 parts VCA on a solids weight basis. Pigment loading in all dispersions was 45 wt %. Each dispersion exhibited an average particle size of 0.8 microns as determined using a MASTERSIZER 2000 particle analyzer.

Several samples of the 8, 4, and 0 wt % dispersions were negatively charged with amounts of sulfosuccinic acid, ditridecyl ester barium salt charge director varying from 5 to 50 mg per gram of N. The charged dispersions were diluted to 2 wt % NVS with ISOPAR L and evaluated in the Q/m test cell. Over the range of charge director amount, particle conductivity was higher for 8 wt % than for 4 wt % and particle conductivity was higher for 4 wt % than for 0 wt %. Differences in particle conductivity were most noticeable in the range of 20 to 50 mg/g of charge director.

Using the samples with 50 mg/g charge director, a study of the effect of LF conductivity on particle conductivity was undertaken in the Q/m test cell comparing performance of the 8, 4, and 0 wt % VCA dispersions. Between 11 and 51 pS LF conductivity, the particle conductivity exhibited by the 8 and 4 wt % dispersions was about the same, but both were greater than the 0 wt % dispersion.

EXAMPLE 10

The method of Example 8 was followed except 1 wt % IRCOSPERSE 2155 (aliphatic succinimide dispersant available from Lubrizol, Ltd. in Manchester, UK) was added to the 2% NVS charged dispersion. A minor effect on particle conductivity was observed with the addition of the dispersant. The 2% NVS charged dispersion was put in an electronic chamber having dimensions of 100×100×10 microns deep with two interdigitated electrodes 30 microns apart. The colored, charged ink particles were observed moving between the electrodes under an alternated voltage. In comparison to the Example 8 dispersion, the Example 10 dispersion cycled more quickly multiple times between states of particles dispersed and particles compacted at the electrodes.

EXAMPLE 11

ANTARON WP-660 wax resin (vinyl pyrrolidone/triacontene copolymer provided as flakes available from International Specialty Products in Wayne, New Jersey) was used exhibiting a molecular weight of 3,000 to 4,500 and a melting point of 58-68° C. The WP-660 was put in a S-0 ATTRITOR batch grinding mill along with Permanent Carmine FBB02 magenta pigment (available from Clariant Intl. Ltd. in Switzerland) and ISOPAR L. The formulation in the mill contained 55 parts wax resin and 45 parts pigment on a solids weight basis in enough ISOPAR L to provide 18 wt % NVS during grinding. Pigment loading was 45 wt %. After grinding for at least 6 hours at 35° C., the resulting dispersion exhibited a particle size distribution with an average of 0.7 microns and a maximum of 1.2 microns as determined using a MASTERSIZER 2000 particle analyzer.

A first sample of the dispersion was positively charged with enough OLOA 1200 (polyisobutylene succinimide polyamines available from Chevron Oronite in San Francisco, California) to yield initial low field conductivity of 80 pS in the Q/m test cell and was allowed to stand overnight. Subsequent Q/m test cell readings showed low field conductivity of 61 pS and high field conductivity of 96 pS. Some of the ink plated on the Q/m test cell negative electrode, evidencing existence of a positive ink. Conductivity readings were considered too low, consequently, charge director load in a second sample of the dispersion was increased sufficiently to yield initial low field conductivity of 200 pS (about 1 wt % charge director) and to give the appearance that all particles were charged positively. The 2% NVS charged dispersion of the first and second samples were put in an electronic chamber having dimensions of 100×100×10 microns deep with two interdigitated electrodes 30 microns apart. The colored, charged ink particles were observed moving between the electrodes under an alternated voltage.

The invention claimed is:

1. An electronic ink comprising positively charged particles that include a combination of:
   resin particles exhibiting an average particle size less than 1.0 micron and containing a resin that exhibits a molecular weight of 500 to 20,000;
   a pigment loaded on the resin particles; and
   a charge director that physically associates with the resin particles.

2. The ink of claim 1 wherein the resin exhibits a MW of 1,000 to 5,000.

3. The ink of claim 1 wherein the resin comprises a vinyl pyrrolidone/triacontene copolymer.

4. The ink of claim 1 wherein the resin exhibits the property of being compatible with a cyan pigment, a magenta pigment, a yellow pigment, a black pigment, other pigments, and combinations thereof.

5. The ink of claim 1 further comprising a dispersing agent.

6. The ink of claim 1 wherein the charge director forms a micelle structure physically associated by hydrophobic bonding with the resin particles to provide at least part of the particle charge.

7. The ink of claim 1 wherein the charge director comprises polyisobutylene succinimide polyamines.

8. An electronic display comprising:
   a pixel;
   an electrode in the pixel; and
   electronic ink in the pixel, the ink containing positively charged particles that include a combination of:
      resin particles exhibiting an average particle size less than 1.0 micron and containing a resin vinyl pyrrolidone/triacontene copolymer;
      a pigment loaded on the resin particles; and
      a charge director that physically associates with the resin particles.

9. The display of claim 8 wherein the resin exhibits a MW of 500 to 20,000.

10. The display of claim 8 wherein the resin exhibits a MW of 1,000 to 5,000.

11. The display of claim 8 wherein the resin particles consist of vinyl pyrrolidone/triacontene copolymer.

12. The display of claim 8 wherein the resin exhibits the property of being compatible with a cyan pigment, a magenta pigment, a yellow pigment, a black pigment, other pigments, and combinations thereof.

13. The display of claim 8 wherein the charge director forms a micelle structure physically associated by hydrophobic bonding with the resin particles to provide the charged particles.

14. The display of claim 8 wherein the charge director comprises polyisobutylene succinimide polyamines.

15. An image displaying method comprising:
   providing an electronic display including a pixel allowing visible light to enter and exit the pixel, an electrode in the pixel, and electronic ink in the pixel, the ink containing positively charged particles that include a combination of:
      resin particles containing a resin vinyl pyrrolidone/triacontene copolymer exhibiting a molecular weight of 500 to 20,000;
      a pigment loaded on the resin particles, the resin exhibiting the property of being compatible with a cyan pigment, a magenta pigment, a yellow pigment, a black pigment, other pigments, and combinations thereof;
      a charge director that physically associates with the resin particles; and
      a dispersing agent;
   applying an electrical signal to the pixel using the electrode and compacting the charged particles using the electrical signal; and
   changing the electrical signal and dispersing the charged particles across the pixel.

16. The method of claim 15 wherein the resin particles exhibit an average particle size less than 1.0 micron.

17. The method of claim 15 wherein the resin particles consist of vinyl pyrrolidone/triacontene copolymer.

18. The method of claim 15 wherein the charge director forms a micelle structure physically associated by hydrophobic bonding with the resin particles to provide the charged particles.

19. The method of claim 15 wherein the charge director comprises polyisobutylene succinimide polyamines.

20. The method of claim 15 further comprising repeatedly compacting and dispersing during at least 10 signal application cycles without substantial degradation of the charged particles.

* * * * *